United States Patent
Yi et al.

(10) Patent No.: US 8,241,408 B2
(45) Date of Patent: Aug. 14, 2012

(54) CARBON DIOXIDE CAPTURING DEVICE INCLUDING WATER VAPOR PRETREATMENT APPARATUS

(75) Inventors: Chang-Keun Yi, Daejeon (KR); Gyong-Tae Jin, Daejeon (KR); Do-Wen Sun, Daejeon (KR); Dal-Hee Bae, Daejeon (KR); Jae-Hyeon Park, Daejeon (KR); Sung-Ho Jo, Daejeon (KR); Ho-Jung Ryu, Daejeon (KR); Seoung-Yong Lee, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 352 days.

(21) Appl. No.: 12/449,503

(22) PCT Filed: Feb. 13, 2007

(86) PCT No.: PCT/KR2007/000761
§ 371 (c)(1),
(2), (4) Date: Feb. 12, 2010

(87) PCT Pub. No.: WO2008/099976
PCT Pub. Date: Aug. 21, 2008

(65) Prior Publication Data
US 2010/0172810 A1    Jul. 8, 2010

(30) Foreign Application Priority Data
Feb. 12, 2007  (KR) .................. 10-2007-0014518

(51) Int. Cl.
*B01D 53/08* (2006.01)
*B01D 53/62* (2006.01)
(52) U.S. Cl. ............ 96/123; 96/150; 423/230; 422/144
(58) Field of Classification Search .................... 96/134, 96/122, 123, 150; 95/139; 423/230, 232, 423/233; 422/292, 139, 144
See application file for complete search history.

(56) References Cited

U.S. PATENT DOCUMENTS

| | | | |
|---|---|---|---|
| 4,539,188 A * | 9/1985 | Hirsch et al. ................. | 423/210 |
| 5,304,234 A * | 4/1994 | Takatsuka et al. ............ | 95/106 |
| 6,387,337 B1 * | 5/2002 | Pennline et al. ............. | 423/220 |
| 2002/0023538 A1 * | 2/2002 | Agarwal et al. ............. | 95/108 |

FOREIGN PATENT DOCUMENTS
KR    10-0527420    11/2005
KR    10-0610337    8/2006

OTHER PUBLICATIONS
English abstract for KR 2006014399 A, published Feb. 2007.*

* cited by examiner

*Primary Examiner* — Frank Lawrence, Jr.
(74) *Attorney, Agent, or Firm* — TIPS Group

(57) ABSTRACT

Disclosed is a CO capturing device for improving CO removal efficiency and use of a dry solid absorbent. The device comprises a CO recovery reactor 1 to permit CO containing gas externally supplied to be in contact with a dry solid absorbent to capture CO; a recovery cyclone 4 connected to the recovery reactor 1 to exhaust CO-free gas while separating a solid portion containing CO; a fluidized bed type regeneration reactor 2 which receives the solid portion through a solid feeding pipe 5 connected to the recovery cyclone 4 and divides the solid portion into CO and the other part containing the dry solid absorbent by using a fluidizing gas fed through a fluidizing gas supply pipe 8; a regeneration cyclone 6 to exhaust the separated CO outside in order to use CO in the regeneration reactor 2; and a water vapor pretreatment device 3 connected to the regeneration reactor 2 to absorb H O in the dry solid absorbent and feedback the H O containing absorbent to the recovery reactor 1.

3 Claims, 3 Drawing Sheets

[Figure 1]
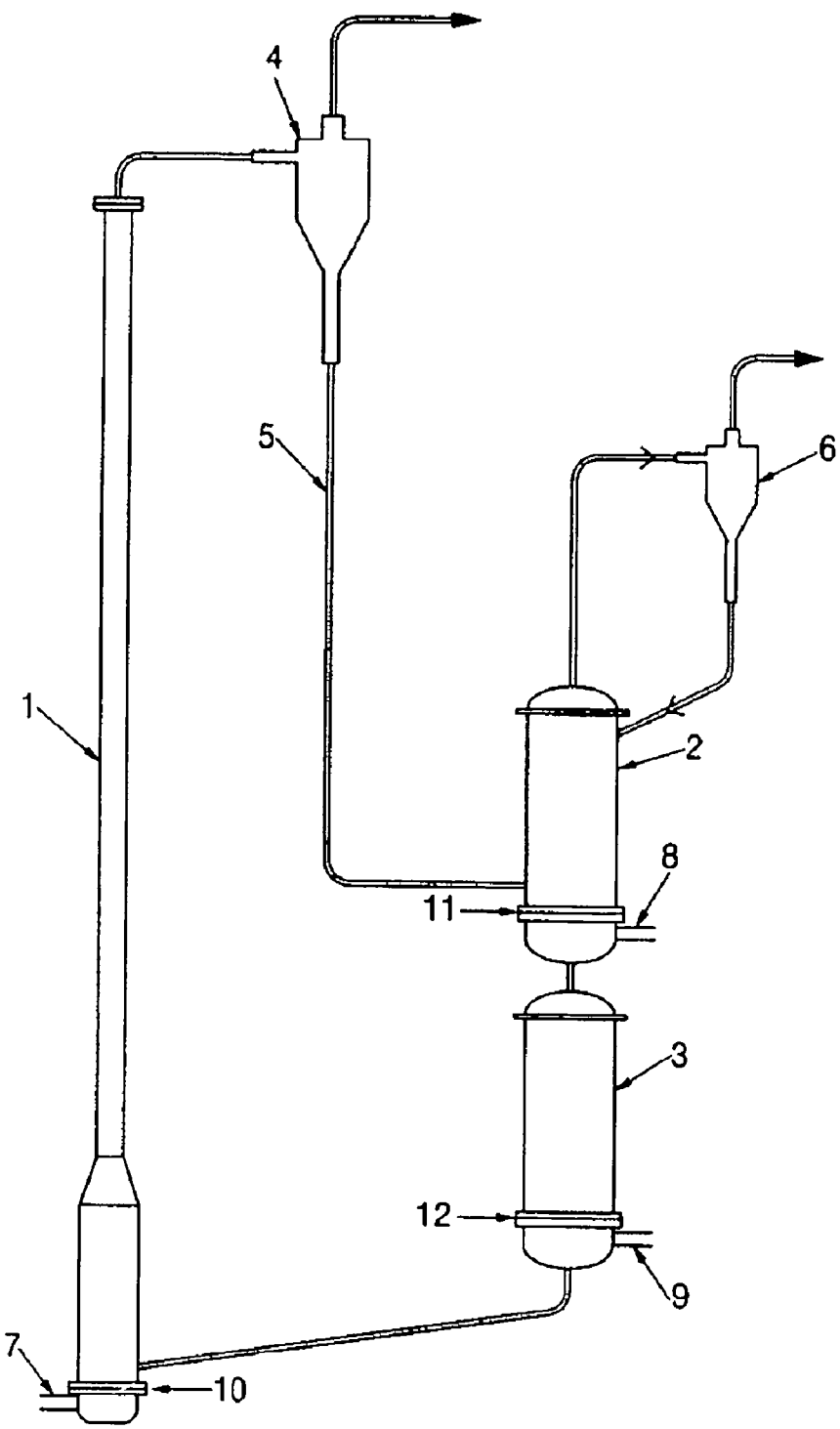

[Figure 2]
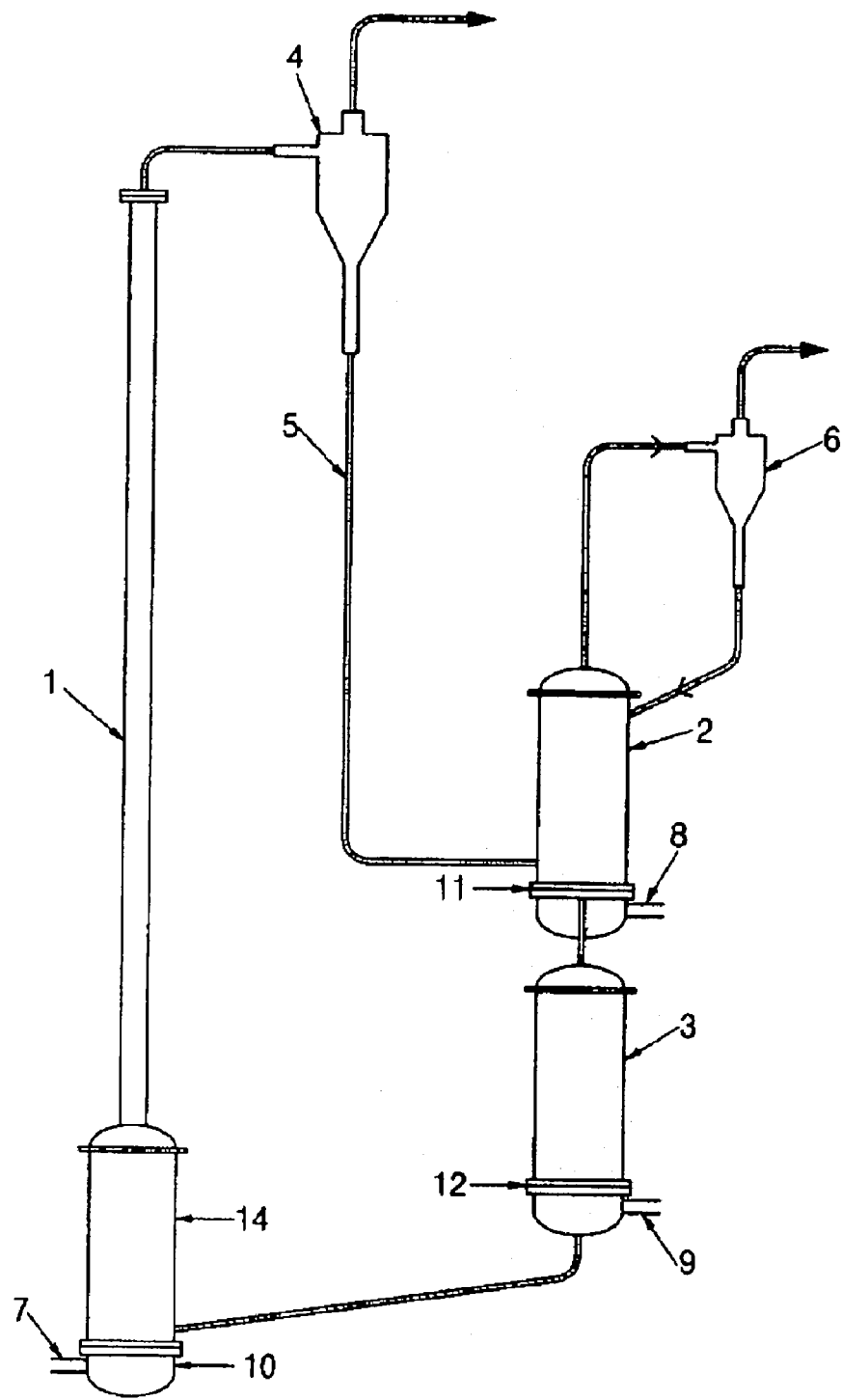

[Figure 3]
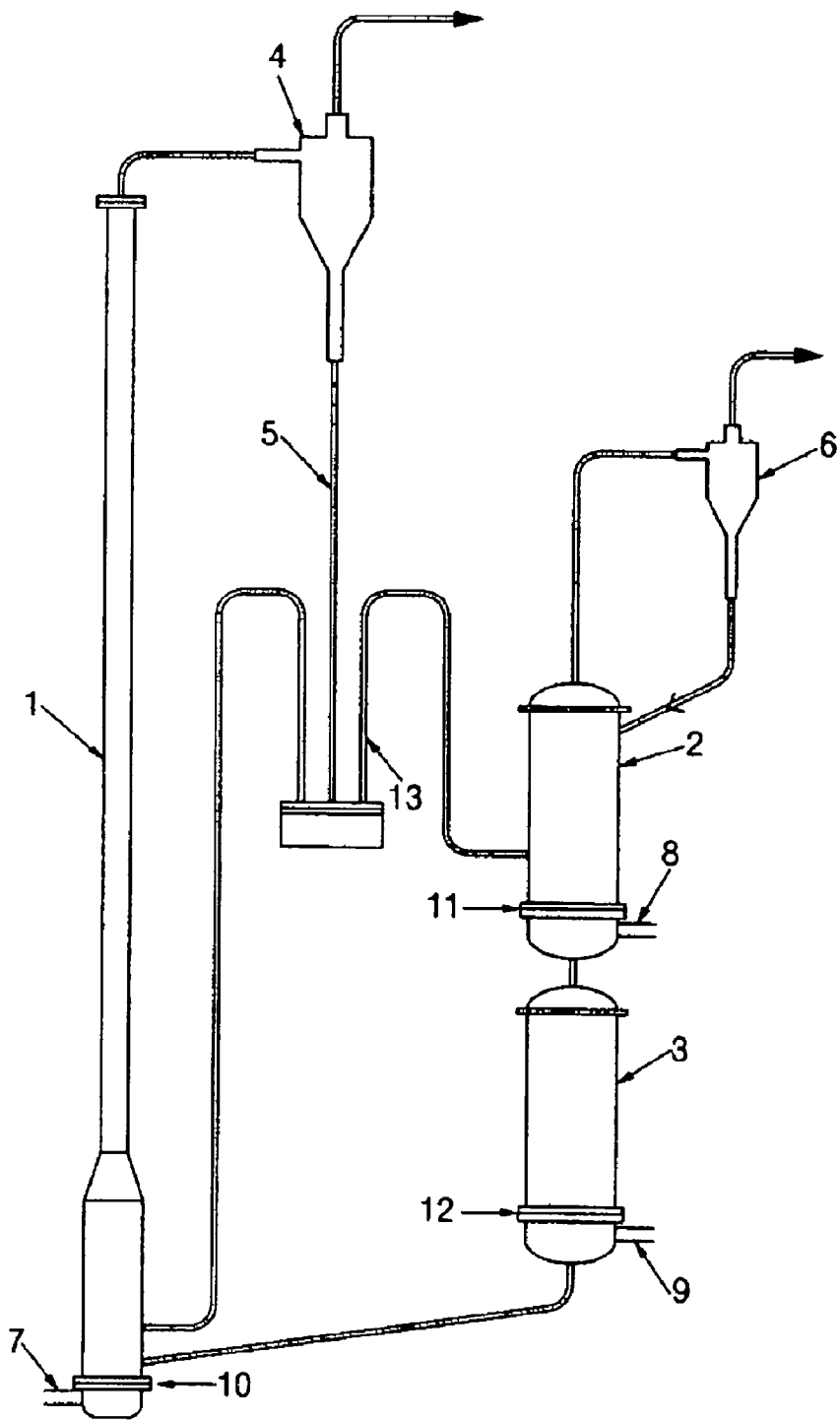

CARBON DIOXIDE CAPTURING DEVICE INCLUDING WATER VAPOR PRETREATMENT APPARATUS

CROSS REFERENCE TO RELATED APPLICATIONS

This application claims the priority of International Application PCT/KR2007/000761, which claims the priority of Korean application number 10-2007-0014518, both of which are incorporated herein by reference.

TECHNICAL FIELD

The present invention relates to a carbon dioxide capturing device including water vapor pretreatment apparatuses, and more particularly, to a device for capturing carbon dioxide ($CO_2$) which includes a recovery reactor for selectively absorbing $CO_2$, a regeneration reactor for recycling $CO_2$ to the original condition thereof while releasing $CO_2$ from solid particles, and a water vapor pretreatment device between the recovering reactor and the regeneration reactor.

BACKGROUND ART

Among conventional methods for recovering $CO_2$, there is a wet process to capture $CO_2$, which comprises passing $CO_2$ through an amine based solution to absorb $CO_2$ and regenerating the solution in a regeneration column. Such wet process has a problem of generating waste water.

In order to solve the above problem, a dry process has been developed which typically separates and recovers $CO_2$ by using a double columns type reactor to permit $CO_2$ gas in the exhaust gas to be homogeneously in contact with a dry solid absorbent and selectively capture only $CO_2$.

Conventional processes and techniques known in the art have disadvantages in that it is difficult to control temperature between the recovery reactor and the regeneration reactor, and the recovery reactor shows low $CO_2$ removal efficiency and less use of absorbents.

DISCLOSURE OF INVENTION

Technical Problem

Accordingly, the present invention is directed to solve the problems described above and, an object of the present invention is to provide a carbon dioxide capturing device including a water vapor ($H_2O$) pretreatment device, which comprises a $CO_2$ recovery reactor, a regeneration reactor and the water vapor pretreatment device between both of the reactors in order to easily control temperature of the reactors and enhance $CO_2$ removal efficiency and use of absorbents.

Technical Solution

In order to achieve the above object and other purposes of the present invention, there is provided a carbon dioxide ($CO_2$) capturing device comprising: a $CO_2$ recovery reactor 1 to permit $CO_2$ containing gas externally supplied to be in contact with a dry solid absorbent in order to capture $CO_2$; a recovery cyclone 4 connected to the recovery reactor 1 to exhaust $CO_2$-free gas while separating a solid portion containing $CO_2$; a fluidized bed type regeneration reactor 2 which receives the solid portion containing $CO_2$ through a solid feeding pipe 5 connected to the recovery cyclone 4 and divides the solid portion into $CO_2$ and the other part containing the dry solid absorbent by using a fluidizing gas; a regeneration cyclone 6 to exhaust the separated $CO_2$ outside in order to use $CO_2$ in the fluidized bed type regeneration reactor 2; and a water vapor pretreatment device 3 connected to the regeneration reactor 2 to absorb $H_2O$ in the dry solid absorbent and feedback the $H_2O$ containing absorbent to the recovery reactor 1.

The recovery reactor 1 is integrated with another fluidized bed type reactor 14 at the bottom side to extend retention time and reaction time in the recovery reactor 1.

The solid feeding pipe 5 is equipped with a bidirectional loop chamber 13 which is further connected to both of the regeneration reactor 2 and the recovery reactor 1 in order to distribute the solid absorbent to the regeneration reactor 2 and the recovery reactor 1.

The water vapor pretreatment device 3 contains $H_2O$ formed by adding steam to the fluidizing gas.

Advantageous Effects

According to the present invention, the carbon dioxide capturing device of the present invention can capture and reduce $CO_2$, as one of major causes for emission of greenhouse gases, in a cost-effective manner, thereby actively dealing with global warming problems.

Especially, the carbon dioxide capturing device of the present invention can improve $CO_2$ removal efficiency and use of a dry solid absorbent by additionally a dopting the water vapor pretreatment device on the regeneration reactor in the $CO_2$ capturing device.

BRIEF DESCRIPTION OF THE DRAWINGS

The above objects, features and advantages of the present invention will become more apparent to those skilled in the related art in conjunction with the accompanying drawings. In the drawings:

FIG. 1 is a schematic view illustrating a $CO_2$ capturing device of Example 1 according to the present invention;

FIG. 2 is a schematic view illustrating a $CO_2$ capturing device of Example 2 according to the present invention; and FIG. 3 is a schematic view illustrating a $CO_2$ capturing device of Example 3 according to the present invention.

DESCRIPTION OF SYMBOLS FOR MAJOR PARTS IN DRAWINGS

1: recovery reactor
2: fluidized bed type regeneration reactor
3: water vapor pretreatment device
4: recovery cyclone
5: solid feeding pipe
6: regeneration cyclone
7: $CO_2$ containing gas inlet pipe
8: fluidizing gas supply pipe
9: hydrated fluidizing gas supply pipe
10, 11, 12: gas distribution plate
13: bidirectional loop chamber
14: fluidized bed type reactor

BEST MODE FOR CARRYING OUT THE INVENTION

Hereinafter, the present invention will be described in detail from the following preferred embodiments with reference to the above drawings. By indicating constitutional elements with numerical symbols as shown in the drawings, the same elements in one of the drawings have the same symbols even if the elements are illustrated in the other drawings. In order to avoid undesirable confusion with important aspects of the present invention, the present invention does not contain the detailed description about typical constructions of the $CO_2$ capturing device and functions thereof commonly known in the art.

The present invention is to improve $CO_2$ removal efficiency and use of a dry solid absorbent in a $CO_2$ capturing device by adopting a $H_2O$ pretreatment reactor which is arranged between a recovery reactor and a regeneration reactor to simply control temperature of the reactors.

FIG. 1 is a schematic view illustrating a $CO_2$ capturing device of Example 1 according to the present invention, which comprises a recovery reactor 1, a regeneration reactor 2, a water vapor pretreatment device 3, a recovery cyclone 4, a regeneration cyclone 6 and a solid feeding pipe 5.

$CO_2$ containing gas is fed to the bottom of the recovery reactor 1 through a $CO_2$ containing gas inlet pipe 7.

The supplied gas with $CO_2$ passes through a gas distribution plate 10 mounted on the bottom of the recovery reactor 1 and enters into the recovery reactor 1. Such gas distribution plate 10 may include a flat porous plate having a number of pores.

The $CO_2$ containing gas in the recovery reactor 1 comes in contact with a dry solid absorbent to recover $CO_2$ from the gas.

The dry solid absorbent may include, but is not limited to, $K_2CO_3$ or $Na_2CO_3$ solid particles.

The recovery reactor 1 is connected to the recovery cyclone 4 at an outer top side, which functions to separate gas from the solid particles. More particularly, the recovery cyclone 4 passes only the solid particles, that is, the dry solid absorbent with absorbed $CO_2$, while exhausting the residual gas outside.

The dry solid absorbent containing $CO_2$ passed through the cyclone 4 goes to the regeneration reactor 2 through the solid feeding pipe 5.

The solid feeding pipe 5 has a role of blocking a gas stream between the recovery reactor 1 and the regeneration reactor 2. Thus, it is preferable to arrange the regeneration reactor 2 at a site lower than the recovery cyclone 4.

A fluidizing gas supply pipe 8 is mounted on the bottom of the regeneration reactor 2 to feed the fluidizing gas through a gas distribution plate 11.

The solid particles provided from the solid feeding pipe 5 are regenerated by fluidization and divided into $CO_2$ and the dry solid absorbent.

Herein, a regeneration cyclone 6 is mounted on the top of the regeneration reactor 2, which separates $CO_2$ from the dry solid absorbent, recycles the solid absorbent to the regeneration reactor 2 while exhausting $CO_2$ gas outside. The exhausted $CO_2$ gas can be used in varied industrial applications including production of dry ice.

The regenerated solid absorbent is introduced into the water vapor pretreatment device 3 connected to the bottom of the regeneration reactor 2, due to self-load of the solid particles in the absorbent.

The water vapor pretreatment device 3 has a hydrated fluidizing gas supply pipe 9 to feed the fluidizing gas with $H_2O$ at the bottom thereof. The fluidizing gas with $H_2O$ is prepared by adding steam to a common fluidizing gas.

The fluidizing gas with $H_2O$ is supplied from the hydrated fluidizing gas supply pipe 9 through a gas distribution plate 12.

The dry solid absorbent can be in contact with the fluidizing gas containing $H_2O$ and absorb $H_2O$ from the gas.

The resultant solid absorbent with the absorbed $H_2O$ returns to the recovery reactor 1 by self-load. Because of high solubility of $CO_2$ in $H_2O$, the solid absorbent with the absorbed $H_2O$ can increase or improve adsorption rate of $CO_2$.

FIG. 2 is a schematic view illustrating a $CO_2$ capturing device of Example 2 according to the present invention, comprising another fluidized bed type reactor 14 fixed to the bottom of the recovery reactor 1, especially, to a part of the recovery reactor in which $CO_2$ containing gas is fed and distributed by the gas distribution plate 10, as different from the device defined in Example 1.

The fluidized bed type reactor 14 has the cross-sectional area larger than that of the recovery reactor 1 and extends retention time and reaction time because of volume expansion and diffusion of $CO_2$ containing gas, thereby resulting in improvements in $CO_2$ removal efficiency and use of the dry solid absorbent.

FIG. 3 is a schematic view illustrating a $CO_2$ capturing device of Example 3 according to the present invention, which has a bidirectional loop chamber 13 fixed to the solid feeding pipe 5, as different from the device defined in Example 1.

The solid feeding pipe 5 is connected to the regeneration reactor 2 and the bottom of the recovery reactor 1 through the bidirectional loop chamber 13.

The bidirectional loop chamber 13 can transfer a part of the dry solid absorbent flowing to the regeneration reactor 2 to the bottom of the recovery reactor 1.

Therefore, the device shown in FIG. 3 is effective to improve $CO_2$ removal efficiency and use of the dry solid absorbent by feeding the absorbent, which was in contact with, but did not absorb, $CO_2$ after passing through the recovery reactor 1 and the recovery cyclone 4, back to the recovery reactor 1.

Also, the bidirectional loop chamber 13 can control an amount of the dry solid absorbent which is fed to the recovery reactor 1 and the regeneration reactor 2, and alter operational conditions of the device.

While the present invention has been described with reference to the preferred embodiments, it will be understood by those skilled in the art that various modifications and variations may be made therein without departing from the spirit and scope of the present invention as defined by the appended claims.

INDUSTRIAL APPLICABILITY

As described in detail above, the carbon dioxide capturing devices using the recycled solid absorbent of the present invention can save energy, practically achieve cost-effective $CO_2$ capturing processes and be applicable to advanced pre-combustion $CO_2$ capturing processes and chemical looping combustors (CLC).

The invention claimed is:

1. A carbon dioxide ($CO_2$) capturing device comprising: a $CO_2$ recovery reactor 1 to permit $CO_2$ containing gas externally supplied to be in contact with a dry solid absorbent to capture $CO_2$; a recovery cyclone 4 connected to the recovery reactor 1 to exhaust $CO_2$-free gas while separating a solid portion containing $CO_2$; a fluidized bed type regeneration reactor 2 which receives the solid portion through a solid feeding pipe 5 connected to the recovery cyclone 4 and divides the solid portion into $CO_2$ and the other part containing the dry solid absorbent by using a fluidizing gas fed through a fluidizing gas supply pipe 8; a regeneration cyclone 6 to exhaust the separate $CO_2$ outside in order to use $CO_2$ from the regeneration reactor 2; and a water vapor pretreatment device 3 connected to the bottom of the regeneration reactor 2 to absorb $H_2O$ in the dry solid absorbent and feedback the $H_2O$ containing absorbent to the recovery reactor 1, wherein the water vapor pretreatment device 3 contains $H_2O$ formed by adding steam.

2. The device according to claim 1, further comprising another fluidized bed type reactor 14 which is integrated with the recovery reactor 1 at the bottom side to extend retention time and reaction time in the recovery reactor 1.

3. The device according to claim 1, further comprising a bidirectional loop chamber 13 which is fixed to the solid feeding pipe 5 and connected to both of the regeneration reactor 2 and the recovery reactor 1 in order to distribute the solid absorbent to the regeneration reactor 2 and the recovery reactor 1.

* * * * *